United States Patent
Chen et al.

(10) Patent No.: US 10,250,126 B1
(45) Date of Patent: Apr. 2, 2019

(54) METHOD FOR CONTROLLING RESONANT CONVERTER

(71) Applicant: MEANWELL (GUANGZHOU) ELECTRONICS CO., LTD, Guangzhou (CN)

(72) Inventors: Po-Ming Chen, New Taipei (TW); Shao-Jie Lu, New Taipei (TW)

(73) Assignee: MEANWELL (GUANGZHOU) ELECTRONICS CO., LTD. (CN)

( * ) Notice: Subject to any disclaimer, the term of this patent is extended or adjusted under 35 U.S.C. 154(b) by 0 days.

(21) Appl. No.: 15/893,807

(22) Filed: Feb. 12, 2018

(51) Int. Cl.
*H02M 3/335* (2006.01)
*H02M 1/42* (2007.01)
*H02M 1/08* (2006.01)
*H02M 7/08* (2006.01)

(52) U.S. Cl.
CPC ............ *H02M 1/4241* (2013.01); *H02M 1/08* (2013.01); *H02M 7/08* (2013.01)

(58) Field of Classification Search
CPC ............ H02M 3/33546; H02M 1/4225; H02M 33/1588; H02M 2001/0058; H02M 3/00; Y02B 70/1433
USPC ...... 363/16–17, 21.09, 26, 41, 49, 84, 89, 98
See application file for complete search history.

(56) References Cited

U.S. PATENT DOCUMENTS

| 4,845,605 A * | 7/1989 | Steigerwald | H02M 3/3376 363/21.03 |
| 6,934,166 B2 * | 8/2005 | Vinciarelli | H02J 1/102 363/17 |
| 8,582,319 B2 * | 11/2013 | Reinberger | H02M 3/3376 323/207 |
| 9,257,913 B1 * | 2/2016 | McDonald | H02M 3/33569 |
| 9,641,061 B2 * | 5/2017 | Kawamura | H02M 3/33523 |
| 2004/0012986 A1 * | 1/2004 | Riggio | H02M 1/4225 363/26 |
| 2015/0349649 A1 * | 12/2015 | Zane | H02M 3/33507 363/21.03 |

* cited by examiner

*Primary Examiner* — Rajnikant B Patel

(57) ABSTRACT

The present invention discloses a method applied in a controller unit of a feedback circuit for controlling a resonant converter. When the operation mode of the resonant converter turns from no load (or light load) to full load (or heave load), the controller unit is configured by the method of the present invention to control a power switch unit in the resonant converter to switch ON and OFF according to an operation frequency of full load (such as 100 KHz), in the case of the fact that an instantaneous drop of the output voltage and a variation of the output current of the resonant converter are over predicted. As a result, the instantaneous drop of the output voltage is largely reduced. Therefore, this method is able to make the resonant converter provide the output voltage stably during the switch between the no-load operation mode and the full-load operation mode.

5 Claims, 10 Drawing Sheets

US 10,250,126 B1

METHOD FOR CONTROLLING RESONANT CONVERTER

BACKGROUND OF THE INVENTION

1. Field of the Invention

The present invention relates to the technology field of power conversion devices, and more particularly to a method for controlling resonant converter.

2. Description of the Prior Art

Technologies of switching-mode power supply (SMPS) have been widely applied in manufacture of power supplies for use in various electrical apparatuses and electronic products. Moreover, since there is a tendency toward developing small-size and light-weight electronic products today, power density of the SMPS needs to be enhanced through raising switching frequency in order to effectively shrink the SMPS's framework volume. Accordingly, LLC resonant converter with advantages of zero voltage switching (ZVS) and zero current switching (ZCS) is hence developed and proposed.

FIG. 1 shows a circuit framework diagram of a conventional LLC resonant converter. As FIG. 1 shows, the conventional LLC resonant converter 2' comprises: a power switch unit 23' coupled with a DC source $V_{DC}$', a resonator unit 24', a transformer unit 25', an output rectification unit 26', and an output filter unit 27', wherein a feedback control module 1' is electrically connected between output terminals of the LLC resonant converter 2' and the power switch unit 23'. Moreover, FIG. 1 also indicates that the said feedback control module 1' mainly comprises a signal detection unit 11', a controller unit 12', and an isolated driver unit 13'. When the LLC resonant converter 2' normally works, the feedback control module 1' is able to control the range of the output voltage of the LLC resonant converter 2' by modulating an operating frequency of the power switch unit 23'. In other words, it must correspondingly widen the range of the operating frequency in the case of the LLC resonant converter 2' being demanded to provide a wide-range output voltage. With response to the wide-range operating frequency, it must simultaneously enhance the hardware of the resonator unit 24'. However, enhancement of the hardware not only causes the increase of the whole volume of the resonator unit 24', but also induces more heat consumption produced under the condition of that resonator unit 24' fails to efficiently show a good response to the variation of the wide-range operating frequency.

In addition, electronic engineers also know that the LLC resonant converter 2' with a wide-range voltage output is difficult to be well controlled. For instance, in the case of turning the operation mode of the LLC resonant converter 2' from no load (or light load) to full load (or heavy load), the feedback control module 1' must adjust the operating frequency largely and rapidly so as to stabilize the output voltage or current of the LLC resonant converter 2' in a standard range. FIG. 2 shows a measurement data of the LLC resonant converter. From FIG. 2, it is found that, there is an instantaneous drop of the output voltage of the LLC resonant converter 2' during the switch between the no-load operation mode and the full-load operation mode, wherein the instantaneous drop value is over 2V. Factors causing the instantaneous drop of the output voltage are found two, which are as follows: (1) the resonator unit 24' exhibits an inadequate output capacitance and fails to achieve the complete energy transfer; and (2) as the label marked by dashed rectangle indicates, the adjustment speed of the operating frequency declining from high frequency to low frequency is too slow. Accordingly, by modulating compensation parameters of controller unit 12', manufactures has implemented a specific method capable of enhancing the adjustment speed of the operating frequency in the LLC resonant converter 2'. However, in spite of the fact that the proposed method is able to improve the instantaneous drop of the output voltage of the LLC resonant converter 2' during the switch between the no-load operation mode and the full-load operation mode, this method is also found to induce unstable ripples on the output signal of the LLC resonant converter 2'.

From above descriptions, it is understood that how to design or develop a method for making the LLC resonant converter 2' provide a wide-range voltage output stably has now become an important issue. In view of the, inventors of the present application have made great efforts to make inventive research thereon and eventually provided a method for controlling resonant converter.

SUMMARY OF THE INVENTION

The primary objective of the present invention is to provide a method applied in a controller unit of a feedback circuit for controlling a resonant converter. When the operation mode of the resonant converter turns from no load (or light load) to full load (or heave load), the controller unit is configured by the method of the present invention to control a power switch unit of the resonant converter to switch ON and OFF according to an operation frequency of full load (such as 100 KHz) in the case of the fact that an instantaneous drop of the output voltage and a variation of the output current of the resonant converter are over predicted. As a result, the instantaneous drop of the output voltage is largely reduced. Therefore, this method is able to make the resonant converter provide the output voltage stably during the switch between the no-load operation mode and the full-load operation mode.

The method for controlling resonant converter of the present invention includes many advantages listing as follows.

(1) This method is capable of making the resonant converter provide a wide-range voltage output by using a low-cost and identical feedback circuit. Moreover, this method can also stabilize the output voltage of the resonant converter under the large variation.
(2) This method is able to rapidly change the operating frequency of the power switch unit in the case of the resonant converter being at a PWM controlling mode.
(3) This method can be integrated in any one conventional feedback circuit, so as to make the feedback circuit capable of stabilizing both the transient state response and steady state response of the resonant converter.

In order to achieve the primary objective of the present invention, the inventor of the present invention provides an embodiment of the method for controlling resonant converter, comprising following steps:

Step S1: inputting a user control signal to a controller unit of the feedback circuit, wherein the controller unit is electrically connected to a power switch unit of the resonant converter and a PFC switch unit of a power factor converter electrically connected between a power input and the resonant converter;

Step S2: the user control signal being determined to a voltage output controlling signal, and the controller unit controlling the power factor converter and the power switch unit according to the user control signal;

Step S3: the power factor converter generating a first output voltage and transmitting the first output voltage to a resonator unit and a transformer unit of the resonant converter, so as to make a second output voltage be outputted from a secondary side of the transformer unit; wherein the first output voltage is generated before the transformer unit outputs the second output voltage;

Step S4: determining the output voltage controlling signal is further converted to a voltage-increasing signal or a voltage-decreasing signal by the controller unit; if the output voltage controlling signal is determined to be the voltage-increasing signal, proceeding to step S5; otherwise, proceeding to step S6;

Step S5: increasing the first output voltage and the second output voltage, and then proceeding back to the step S4; and Step S6: decreasing the first output voltage and the second output voltage, and then proceeding back to the step S4.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a method for controlling resonant converter disclosed by the present invention, embodiments of the present invention will be described in detail with reference to the attached drawings hereinafter.

Figure 3:
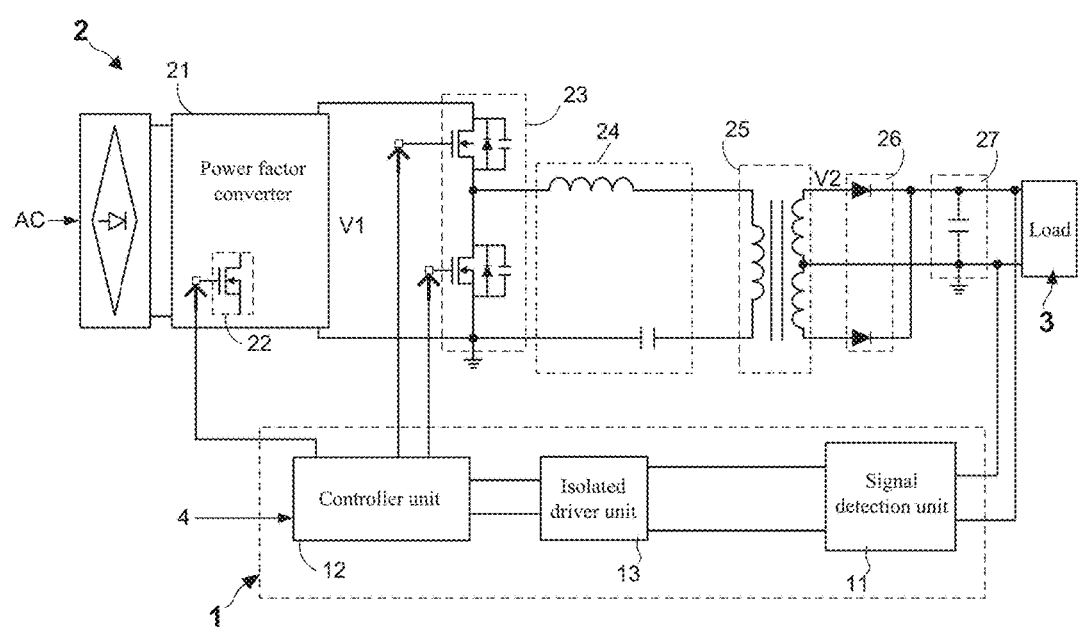
FIG. 3 shows a circuit framework diagram of a resonant converter applied with a method for controlling resonant converter according to the present invention.

With reference to FIG. 3, there is provided a circuit framework diagram of a resonant converter applied with a method for controlling resonant converter according to the present invention. As FIG. 3 shows, this resonant converter controlling method is implemented in a controller unit 12 of a feedback circuit 1, wherein the feedback circuit 1 is electrically connected between the resonant converter 2 and a load 3. FIG. 3 also depicts that the resonant converter 2 comprises: a power factor converter 21, a PFC switch unit 22, a power switch unit 23, a resonator unit 24, a transformer unit 25, an output rectification unit 26, and an output filter unit 27. Moreover, the feedback circuit 1 further comprises a signal detection unit 11 and an isolated driver unit 13. Electronic engineers skilled in development and manufacture of the resonant converter 2 should know that, the power factor converter 21 can be a buck type power factor converter, a boost type power factor converter or a buck-boost type power factor converter. On the other hand, the PFC switch unit 22 is particularly arranged to dominate the operation of the power factor converter 21, such that the output voltage of the power factor converter 21 can be adjusted by changing the duty cycle of the PFC switch unit 22.

In general, the power switch unit 23 is a half-bridge driving circuit formed by two MOSFETs, and the resonator unit 24 is an LLC series resonant tank. Moreover, the signal detection unit 11 is designed to sense an output voltage and an output current transmitted from the resonant converter 2 to the load 3. On the other hand, the isolated driver unit 13 is an optic coupler and the controller unit 12 is a programmable logic controller chip. According to the present invention, as FIG. 3 shows, the controller unit 12 receiving sense data of the output voltage and the output current through the isolated driver unit 13 after the signal detection unit 11 finishes the detection of output signal of the resonant converter 2. Therefore, the controller generates a switch controlling signal based the sense data of the output voltage and the output current, so as to make the power switch unit 23 periodically turn ON and OFF based on the controlling of the switch controlling signal. It needs to further explain that, the controller unit 12 can also be arranged between the isolated driver unit 13 and the signal detection unit 11 in practical use of the feedback circuit 1. By such arrangement, the controller unit 12 directly receiving sense data of the output voltage and the output current from the signal detection unit 11 after the detection of output signal of the resonant converter 2 is completed. Therefore, the controller generates a switch controlling signal based the sense data, so as to subsequently transmit the switch controlling signal to the power switch unit 23 via the isolated driver unit 13. Consequently, the power switch unit 23 is controlled to periodically turn ON and OFF by the switch controlling signal.

Figure 4A:
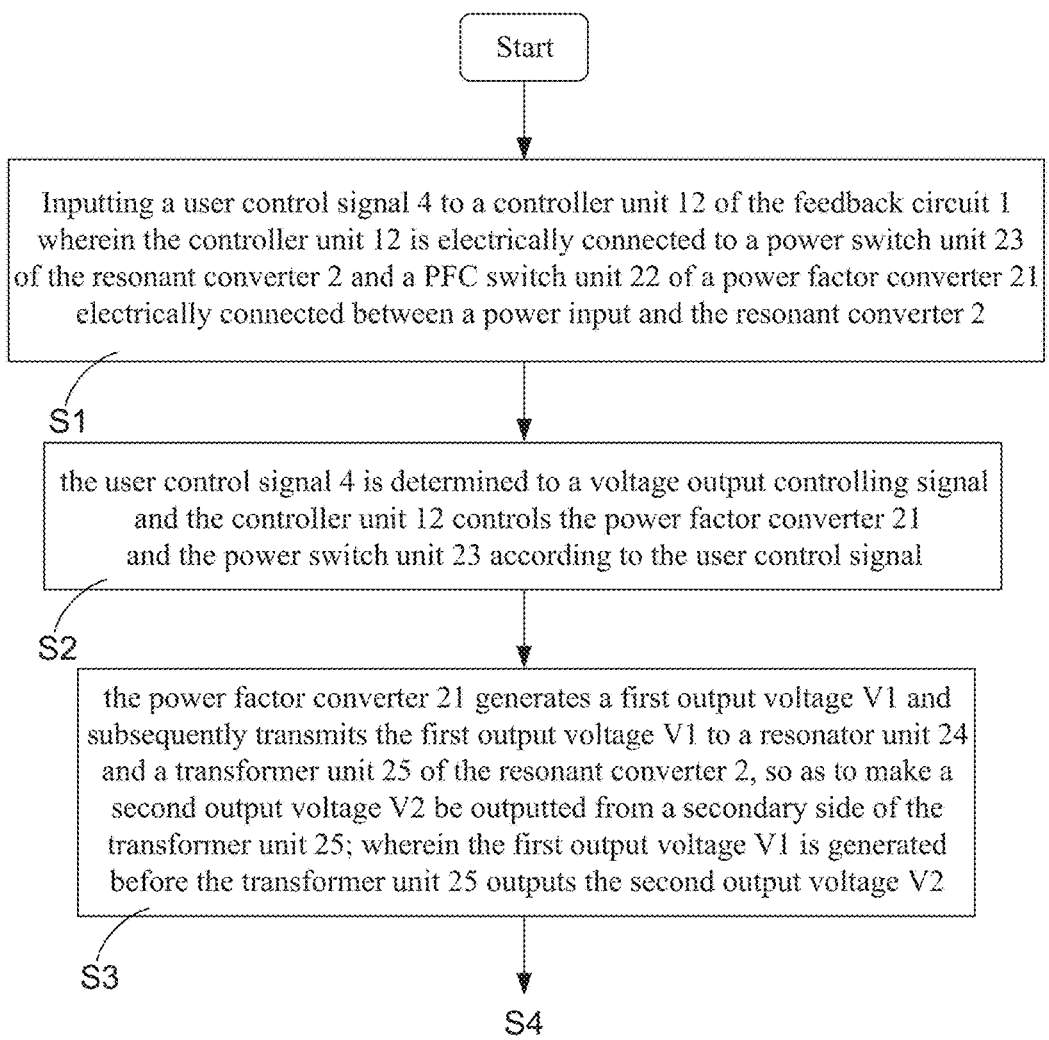
FIG. 4A and FIG. 4B show flowchart diagrams of the method for controlling resonant converter.
Figure 4B:
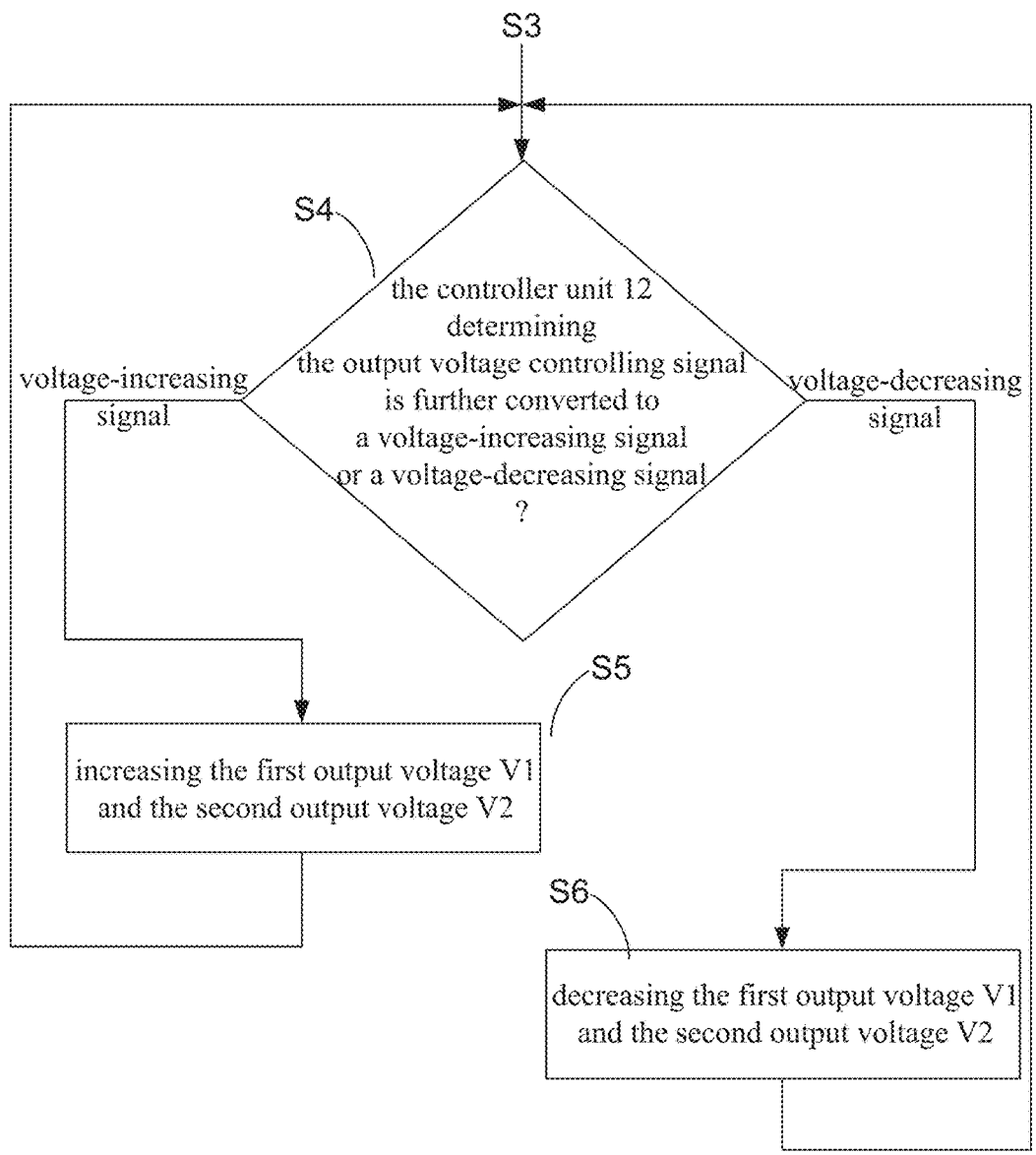

From above descriptions, it is understood that the framework topology of the feedback circuit 1 can be flexibly adjusted according to the needs of practical use. For instance, when there is a need for having two detecting points to monitoring the output signal of the resonant converter, it is able to arrange two isolated driver units 13 for transmitting sense data of the output signal to the controller unit 12. Briefly speaking, with the increase of the number of the detecting points, it can arrange the driver units 13 with the quantity equal to that of the detecting points in the feedback circuit 1. Continuously referring to FIG. 3, and please simultaneously refer to FIG. 4A and FIG. 4B, there are provided flowchart diagrams of the method for controlling resonant converter according to the present invention. The method is used for making the resonant converter 2 provides a wide-range voltage output, and comprises following steps:

Step S1: inputting a user control signal 4 to a controller unit 12 of the feedback circuit 1, wherein the controller unit 12 is electrically connected to a power switch unit 23 of the resonant converter 2 and a PFC switch unit 22 of a power factor converter 21 electrically connected between a power input and the resonant converter 2;

Step S2: the user control signal 4 is determined to a voltage output controlling signal, and the controller unit 12 controls the power factor converter 21 and the power switch unit 23 according to the user control signal;

Step S3: the power factor converter 21 generates a first output voltage V1 and subsequently transmits the first output voltage V1 to a resonator unit 24 and a transformer unit 25 of the resonant converter 2, so as to make a second output voltage V2 be outputted from a secondary side of the transformer unit 25; wherein the first output voltage V1 is generated before the transformer unit 25 outputs the second output voltage V2;

Step S4: the controller unit 12 determining the output voltage controlling signal is further converted to a voltage-increasing signal or a voltage-decreasing signal; if the output voltage controlling signal is determined to be the voltage-increasing signal, proceeding to step S5; otherwise, proceeding to step S6;

Step S5: increasing the first output voltage V1 and the second output voltage V2, and then proceeding back to the step S3; and Step S6: decreasing the first output voltage V1 and the second output voltage V2, and then proceeding back to the step S3.

Figure 5:
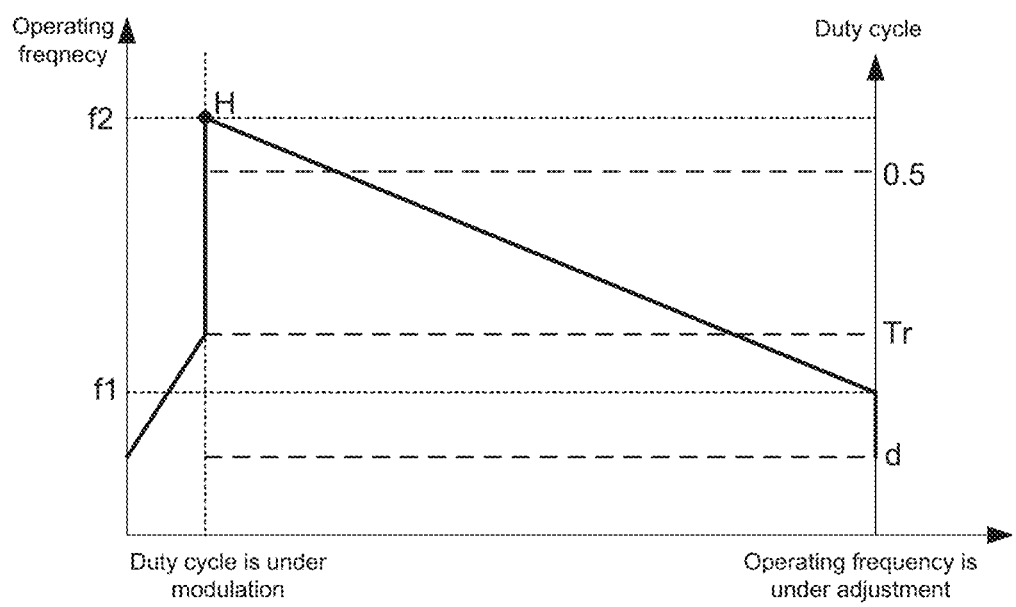
FIG. 5 shows a diagram for describing the resonant converter controlling method.

It is worth noting that, in order to maintain the system stability of the resonant converter 2, the first output voltage V1 must be generated before the transformer unit 25 outputs the second output voltage V2. On the other hand, FIG. 5 shows a diagram for describing the resonant converter controlling method of the present invention. According to the particular design of the present invention, the said user control signal 4 can also be converted to a duty cycle modulating signal, the controller unit 12 controls the power factor converter 21 with the duty cycle modulating signal; meanwhile, the user control signal 4 is converted to an operating frequency controlling signal so as to modulate the operating frequency of the power switch unit 23. Briefly speaking, the controller unit 12 is configured to control the power switch unit 23 by using a switch controlling signal with a modulated operating frequency and a constant duty cycle. As FIG. 5 shows, the controller unit 12 controls the power switch unit 23 by adjusting operating frequency in a range between a lowest frequency f1 and a highest frequency f2, while the duty cycle is fixed at 0.5. As a result, the output voltage of the resonant converter 2 is changed with the modulation of the operating frequency. In addition, the user control signal 4 can also be converted to an operating frequency controlling signal, such that the controller unit 12 correspondingly determines whether the operating frequency of the power switch unit 23 is in a limited range. If the operating frequency is found to be out of the limit range, the user control signal 4 is converted to a duty cycle modulating signal, therefore the controller unit 12 controls the power switch unit 23 by using a switch controlling signal with a modulated duty cycle and a constant operating frequency. As FIG. 5 shows, the controller unit 12 controls the power switch unit 23 by adjusting a duty cycle to change in a range between a lowest duty cycle d and a highest duty cycle Tr.

It is a common technology operation for the electronic engineers to make the resonant converter 2 provide a wide-range voltage output by adjusting the operating frequency to vary in a wide frequency range. However, for achieving that the operating frequency can be varied in a wide frequency range, the resonator unit 24 must be huge enough to complete energy transferring. Briefly speaking, the size of the electronic components of the resonator unit 24 must be enlarged. Accordingly, this resonant converter controlling method is capable of making the resonant converter 2 provide wide-range voltage output by using a low-cost and identical feedback circuit 1. According to the present invention, when the output voltage of the resonant converter 2 needs to be changed, the user control signal 4 is converted to a first switch controlling signal with a first duty cycle, so as to facilitate the controller unit 12 use the first switch controlling signal to drive the PFC switch unit 22 of the power factor converter 21 turning ON and OFF based on the first duty cycle. Therefore, the first switch controlling signal can be changed for modulating output voltage (i.e., the first output voltage V1) of the power factor converter 21, such that the output voltage (i.e., the second output voltage V2) of the resonant converter 2 can be correspondingly changed. On the other hand, for stabilizing the system stability of the resonant converter 2, the user control signal 4 is converted to an operating frequency controlling signal for making the operating frequency of the resonant converter 2 can be modulated in range. That is, the power switch unit 23 is controlled by a switch controlling signal with a modulated frequency and a constant duty cycle. As FIG. 5 shows, the operation frequency is well controlled to be lower than a point H. Therefore, the user control signal 4 is then converted to a second switch controlling signal, and then the controller unit 12 controls the power switch unit 23 by the second switch controlling signal with a modulated duty cycle and a constant frequency.

In the present invention, the user control signal 4 can also be converted to a voltage value. Therefore, when the step S4 is executed, the controller unit 12 would simultaneously rise the duty cycle and the operating frequency after the voltage value is determined to be greater than a threshold voltage value. As a result, range of the first output voltage V1 and range of the second output voltage V2 are both widened. On the contrary, during the execution of the step S4, the controller unit 12 would narrow the range of the first output voltage V1 and the range of the second output voltage V2. In other words, the resonant converter controlling method steppedly controls the output voltage of the resonant converter 2 by using the user control signal 4. For example, the controller unit 12 is facilitated to increase (decrease) the first voltage output V1 and the second voltage output V2 after determining that the voltage value converted from the user control signal 4 is greater (lower) than a predetermined value. It is worth explaining that, this resonant converter controlling method is not only able to control the resonant converter 2 provide wide-range voltage output, but also facilitate the feedback circuit 1 have a simple and easy framework design as well as effectively reduce the whole volume of the resonant converter 2.

Figure 6:
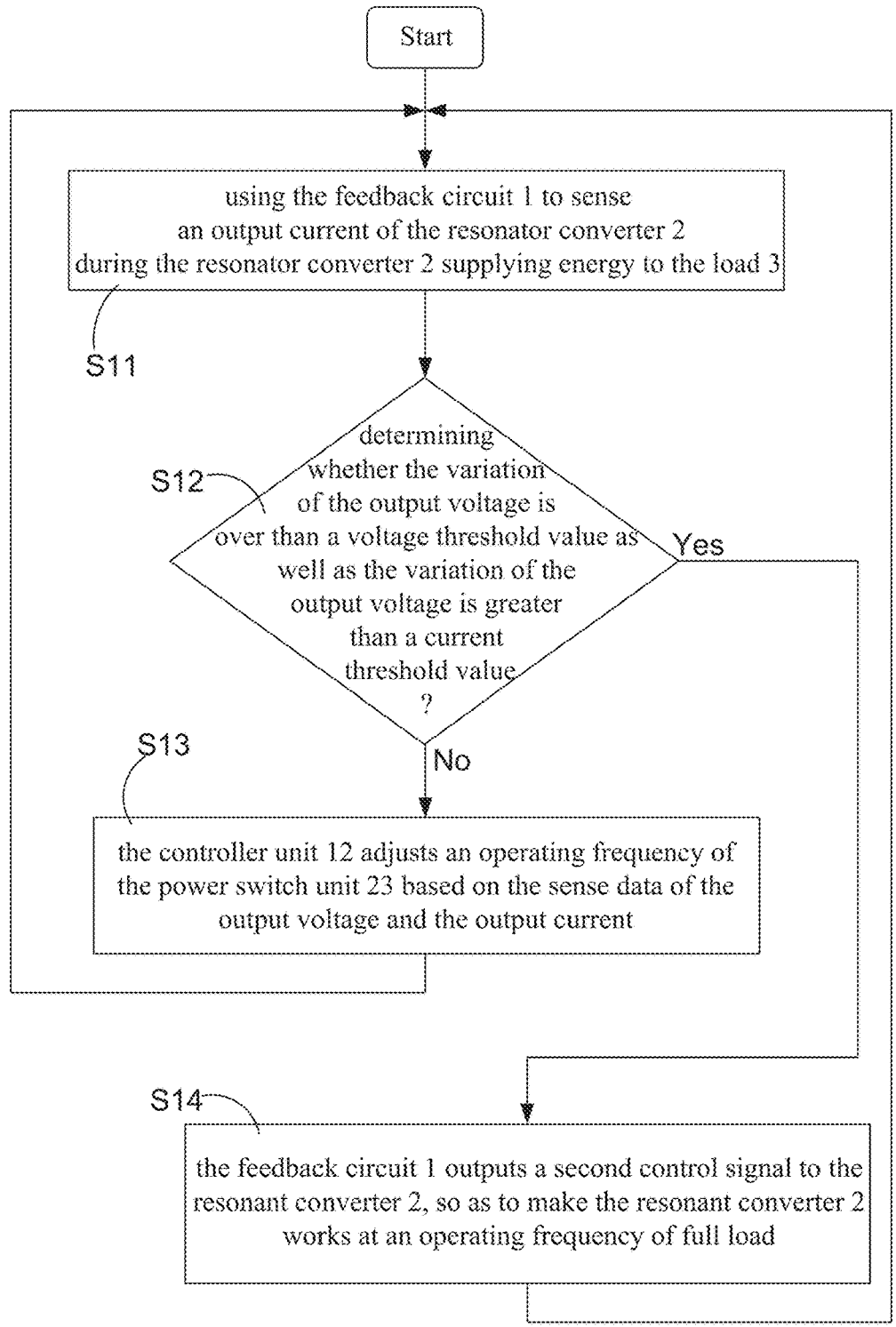
FIG. 6 shows a flowchart diagram for describing steps proposed by the present invention to stabilize the output voltage of the resonant converter.

FIG. 6 shows a flowchart diagram for describing steps proposed by the present invention to stabilize the output voltage of the resonant converter. When there is load variation occurring, the system stability of the resonant converter 2 would be influenced and then tends to be unstable. In the meantime, as FIG. 6 shows, the method of the present invention would firstly execute step S11 for using the feedback circuit 1 to monitoring variations of an output current and an output voltage of the resonant converter 2. Next, the method flow proceeds to step S12 for determining whether the variation of the output voltage is over than a voltage threshold value as well as the variation of the output voltage is greater than a current threshold value. If yes, the method flow proceeds to step S14; otherwise, proceeding to step S13. According to the present invention, the voltage threshold value can be set to be 200 mV. Briefly speaking, when the variation of the output voltage exceeds 200 mV, the system stability of the resonant converter 2 would be influenced and then tends to be unstable. On the other hand, the current threshold value is exemplarily set to be 10 A. Actually, the resonant converter 2 turns into a heavy-load operation mode when the output current is over 10 A. It is worth explaining that, when applying this resonant converter controlling method to a feedback circuit 1, the above-mentioned predetermined values of the output voltage and the output current can be correspondingly adjust based on the characteristics of the resonator unit 24.

On the contrary, when the instantaneous drop of the output voltage is found not to be over 200 mV as well as the variation of the output current is also determined to be less than 10 A, the method flow would proceed to step S13; therefore, the feedback circuit 1 generates a first control signal with an operating frequency based on the monitored output voltage and the monitored output current, and then outputting the first control signal to the resonant converter; subsequently, proceeding back to the step S11. Consequently, during the execution of the step S11, the power switch unit 23 of the resonant converter 2 is controlled by a PWM signal (i.e., the first control signal) comprising 2-19 conducting periods, and each of the conducting periods comprising a first time interval and a second time interval; wherein the power switch unit 23 is turned ON in the first time interval, and turned OFF in the second time interval. Moreover, the said operating frequency is calculated based on element parameters of the resonator unit 24 (i.e., LLC series resonant tank) and pre-stored in the controller unit 12 of the feedback circuit 1. Briefly speaking, in the case of the fact that the load variation does not reach a predetermined condition, the feedback circuit 1 is configured to properly adjust the operating frequency of the power switch unit 23 based on the sense data of the output voltage and the output current.

Figure 7:
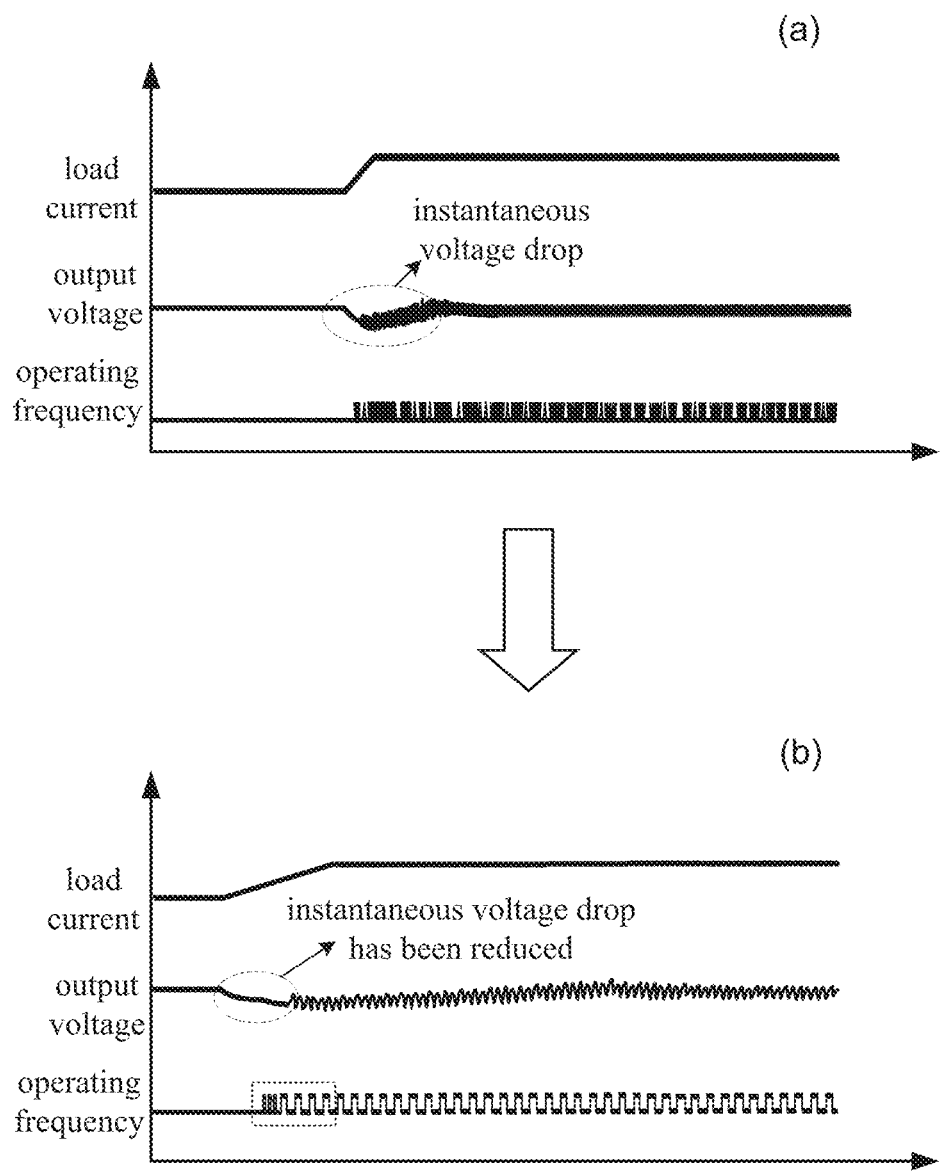
FIG. 7 shows a measurement data of the resonant converter.

Continuously referring to FIG. 6, and please simultaneously refer to a measurement data of the resonant converter provided in FIG. 7. During the execution of the step S14, the feedback circuit 1 outputs a second control signal to the resonant converter 2, so as to make the resonant converter 2 works at an operating frequency of full load. The said operating frequency of full load is calculated to be 100 KHz based the measurement data of the resonant converter 2 with a specific machine model. Briefly speaking, when the feedback circuit 1 finds the load variation is over the predetermined condition (as the measurement data (a) of FIG. 7 shows), the controller unit 12 directly output the said second control signal with the operating frequency of full load to the power switch unit 23, without considering the output voltage error. Moreover, after the power switch unit 23 is controlled by the second control signal, as the measurement data (b) of FIG. 7 shows, not only is the instantaneous drop of the output voltage reduced to 0.9V, but induced unstable ripples occurring on the output signal of the resonant converter are also improved.

Figure 8:
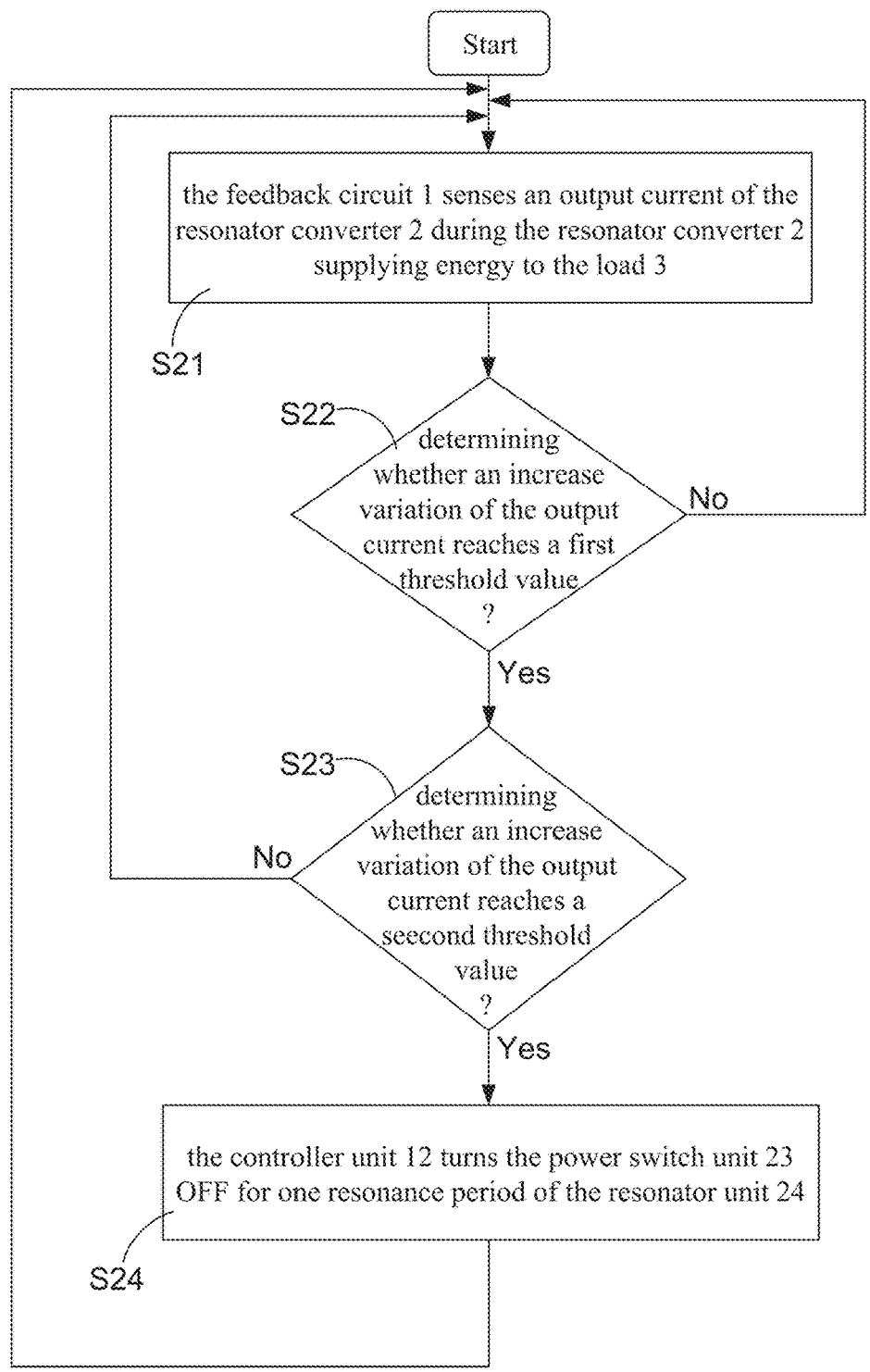
FIG. 8 shows a flowchart diagram for describing steps proposed by the present invention to solve the over load of the resonant converter.
Figure 9:
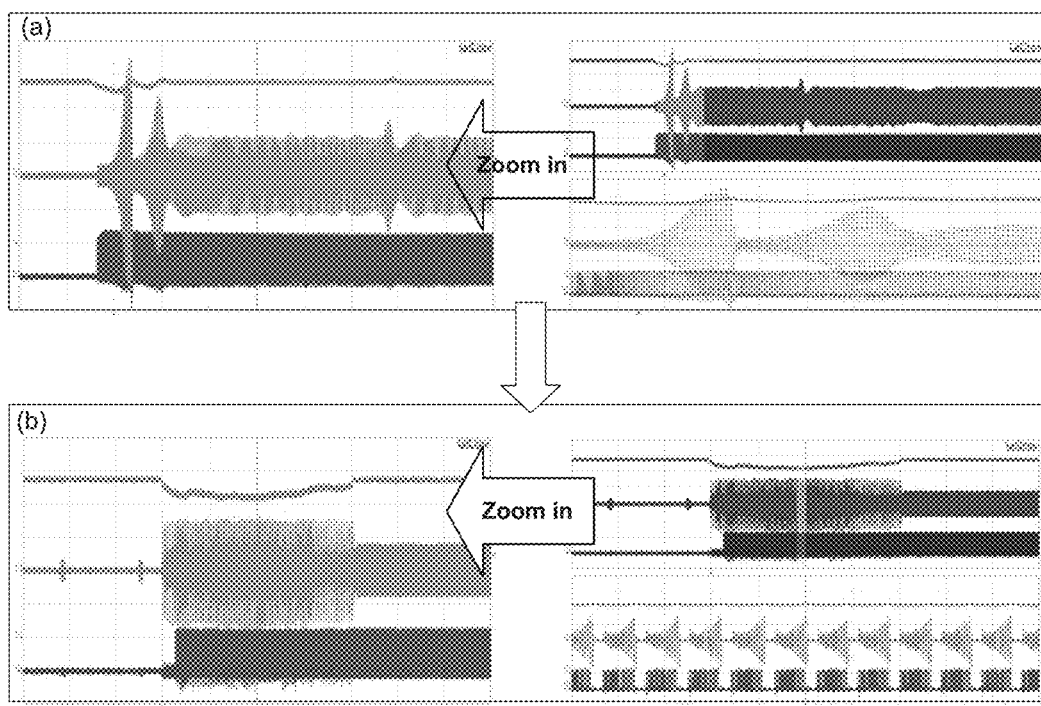
FIG. 9 shows a measurement data of the resonant converter.

Continuously referring to FIG. 5 and FIG. 6, and please simultaneously refer to FIG. 8 and FIG. 9; wherein FIG. 8 shows a flowchart diagram for describing steps proposed by the present invention to solve the over load of the resonant converter, and FIG. 9 shows a measurement data of the resonant converter. This method further has over-load (current) protection functionality. When the resonant converter is found to has an over load, the resonant converter controlling of the present invention firstly execute steps S21 and S22, such that the feedback circuit 1 senses an output current of the resonator converter 2 during the resonant converter 2 supplying energy to the load 3, and then determining whether an increase variation of the output current reaches a first threshold value. If yes, the method flow proceeds to step S23; otherwise, proceeding back to the step S21. During the execution of the step S23, the controller unit 12 adjusts an operating frequency of the power switch unit 23 based on the sense data of the output voltage and the output current, and subsequently determining whether the increase variation of the output current continuously reaches a second threshold value. If yes, the method flow proceeds to step S24; otherwise, proceeding back to the step S21. Therefore, during the execution of the step S24, the controller unit 12 turns the power switch unit 23 OFF for one resonance period of the resonator unit 24; and subsequently, the method flow proceeds back to the step S21. According to the present invention, the second threshold value is greater than the first threshold value, and the resonance period is a time interval for making the resonator unit able to fully releasing storing energy. Moreover, the power switch unit 23 of the resonant converter 2 is controlled by a PWM signal (i.e., the control signal) comprising 1-3 conducting periods, and each of the conducting periods comprising a first time interval and a second time interval; wherein the power switch unit 23 is turned ON in the first time interval, and turned OFF in the second time interval.

The first threshold value and the second threshold value are exemplarily set to be 10 A and 13 A, respectively. when the feedback circuit 1 finds that the variation of the output current is over 10 A (as the measurement data (a) of FIG. 9 shows), the controller unit 12 directly output the said second control signal with the operating frequency of full load to the power switch unit 23, without considering the output voltage error. Particularly, when feedback circuit 1 finds that the variation of the output current continuously rises and is over 13 A, the controller unit 12 turn the power switch unit 23 OFF for one resonance period by using a third control signal. The measurement data (a) of FIG. 9 shows the efficiency of the over-load (current) protection functionality exhibited by the present invention.

Figure 1:
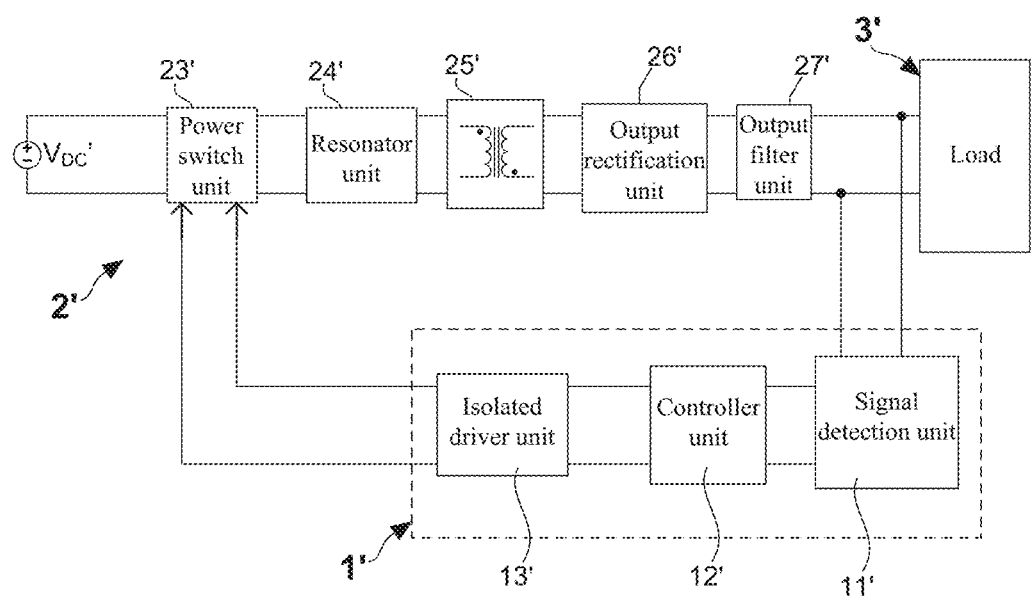
FIG. 1 shows a circuit framework diagram of a conventional LLC resonant converter.
Figure 2:
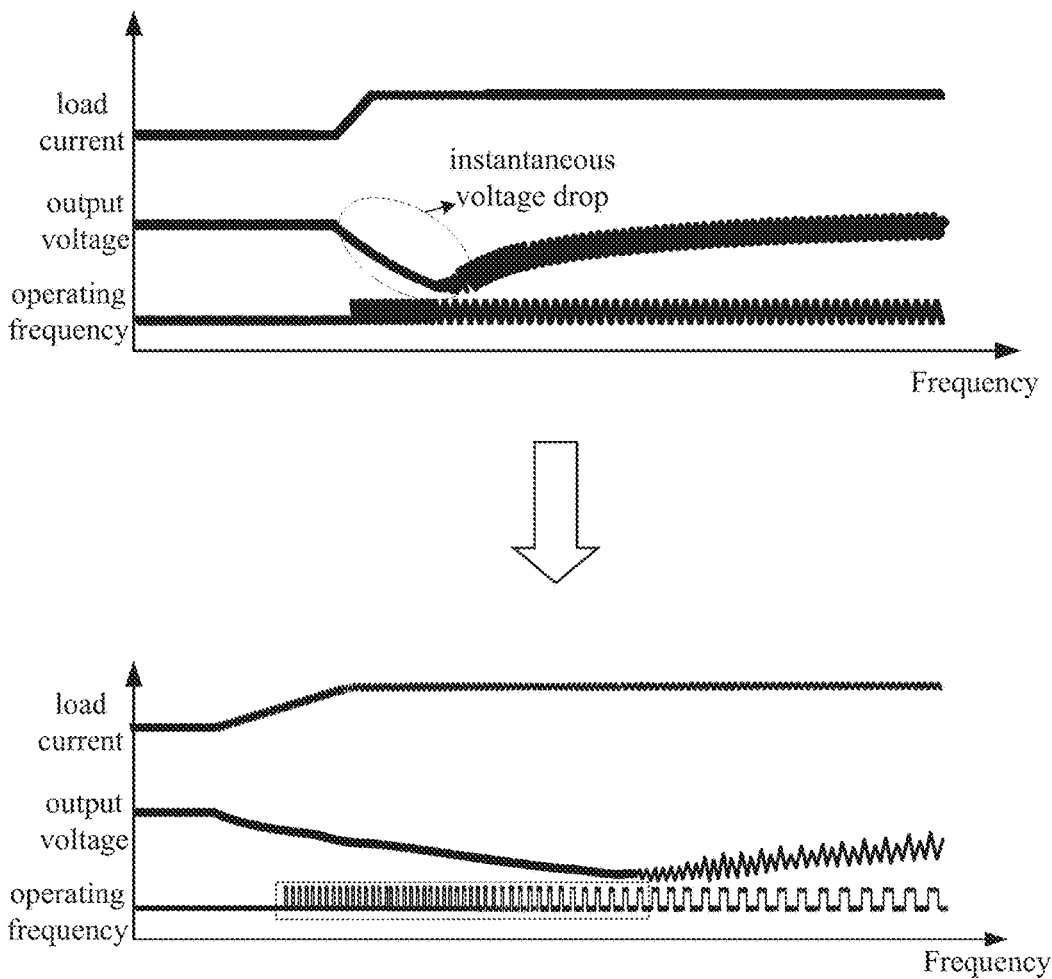
FIG. 2 shows a measurement data of the LLC resonant converter.

Therefore, through above descriptions, the method for controlling resonant converter proposed by the present invention has been introduced completely and clearly; in summary, the present invention includes the advantages of:

(1) The LLC resonant converter 2' (as shown in FIG. 1) with a wide-range voltage output is known unable to well controlled. In view of that, the present invention particularly discloses a method applied in a controller unit 12 of a feedback circuit 1 for controlling a resonant converter 2. When the operation mode of the resonant converter 2 turns from no load (or light load) to full load (or heave load), the controller unit 12 is configured by the method of the present invention to control a power switch unit 23 in the resonant converter 2 to switch ON and OFF according to an operation frequency of full load (such as 100 KHz), in the case of the fact that an instantaneous drop of the output voltage and a variation of the output current of the resonant converter 2 are over predicted. As a result, the instantaneous drop of the output voltage is largely reduced. Moreover, experimental data have proved that, this method is able to make the resonant converter 2 provide an wide-range voltage output with high system stability during the switch between the no-load operation mode and the full-load operation mode.

In addition, this method further has over-load (current) protection functionality by pre-setting a first threshold value and a second threshold value, e.g., 10A and 13A. Therefore, when the feedback circuit 1 finds that the variation of the output current is over 10 A, the controller unit 12 directly output the said second control signal with the operating frequency of full load to the power switch unit 23, without considering the output voltage error. Furthermore, when feedback circuit 1 finds that the variation of the output current continuously rises and is over 13 A, the controller unit 12 turn the power switch unit 23 OFF for one resonance period by using a third control signal.

The above description is made on embodiments of the present invention. However, the embodiments are not intended to limit scope of the present invention, and all equivalent implementations or alterations within the spirit of the present invention still fall within the scope of the present invention.

What is claimed is:

1. A method applied in a feedback circuit electrically connected between a load and a resonant converter having a power switch unit, being used for controlling the resonant converter and comprising following steps:
    (1) using the feedback circuit to monitor a current variation of an output current and a voltage variation of an output voltage of the resonant converter;
    (2) determining whether the output voltage is greater than a voltage threshold value of 200 mV as well as the current variation exceeds a first current threshold value of 10 A; if yes, proceeding to step (4); otherwise, proceeding to step (3);
    (3) the feedback circuit being configured to generate a first control signal with an operating frequency based on the monitored output voltage and the monitored output current and then outputting the first control signal to the resonant converter; subsequently, proceeding back to the step (1);
    (4) the feedback circuit being configured to output a second control signal to the resonant converter, so as to make the resonant converter work at an operating frequency of full load; wherein the operating frequency of full load is 100 KHz.

2. The method of claim 1, wherein the feedback circuit comprises:
    a signal detection unit, being configured for monitoring the output current and the output voltage of the resonant converter;
    an isolated driver unit, being electrically connected to the signal detection unit; and
    a controller unit, being electrically connected to the isolated driver unit, and being configured for generating the first control signal, the second control signal or the third control signal based on the output current and the output voltage.

3. The method of claim 2, wherein the resonant converter further comprises:
    a power factor converter, being the electrically connected to an input power and power switch unit, and having a PFC switch unit electrically connected to the controller unit;
    a resonator unit, being electrically connected to the power factor converter;
    a transformer unit, being electrically connected to the resonator unit;
    an output rectification unit, being electrically connected to the transformer unit; and
    an output filter unit, being electrically connected to the output rectification unit, and being also electrically connected to the signal detection unit.

4. The method of claim 2, wherein the power switch unit of the resonant converter is controlled by a PWM signal comprising 2-19 conducting periods in the step (1); and wherein each of the conducting periods comprising a first time interval and a second time interval; wherein the power switch unit is turned ON in the first time interval, and turned OFF in the second time interval.

5. The method of claim 3, wherein the operating frequency of full load is calculated based on element parameters of the resonator unit and pre-stored in the controller unit of the feedback circuit.

* * * * *